Figure 1:
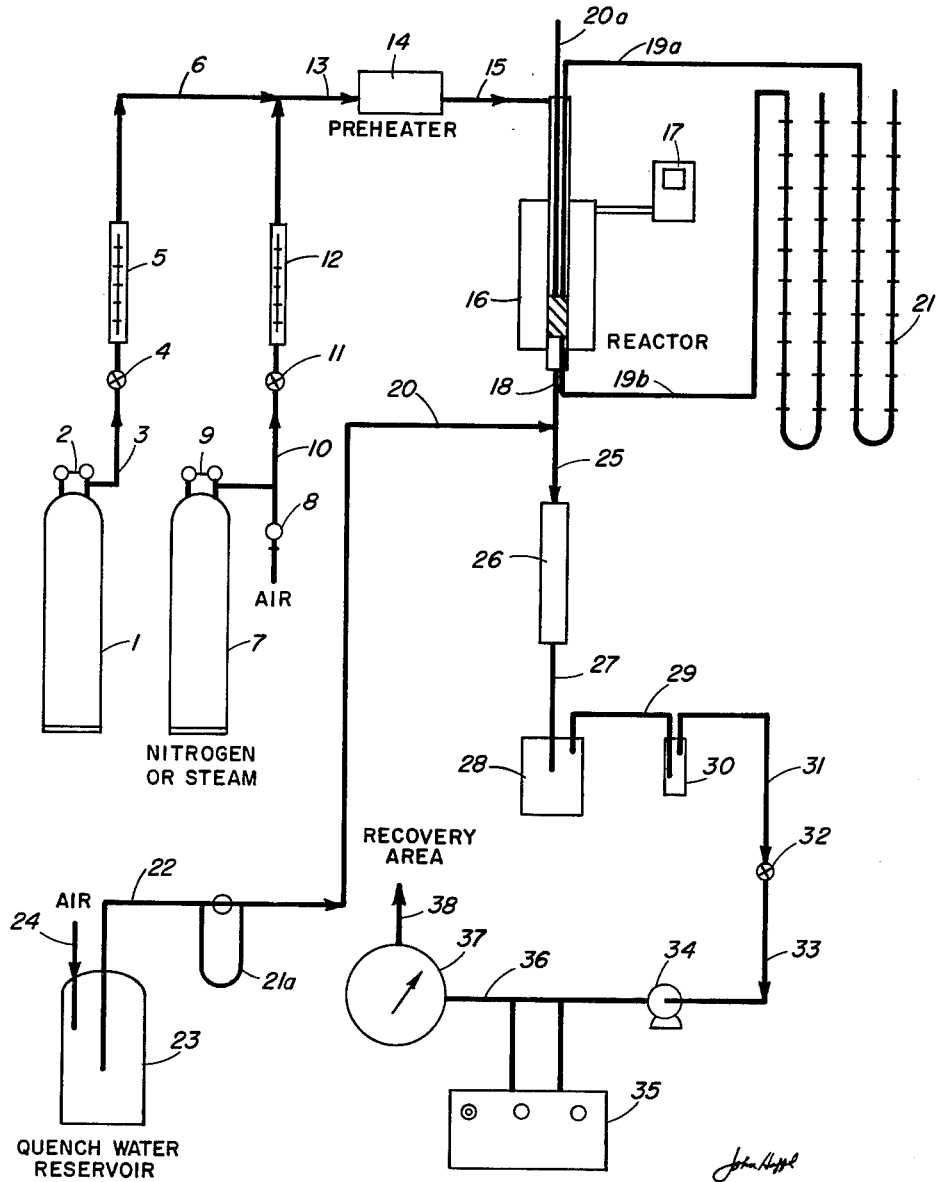

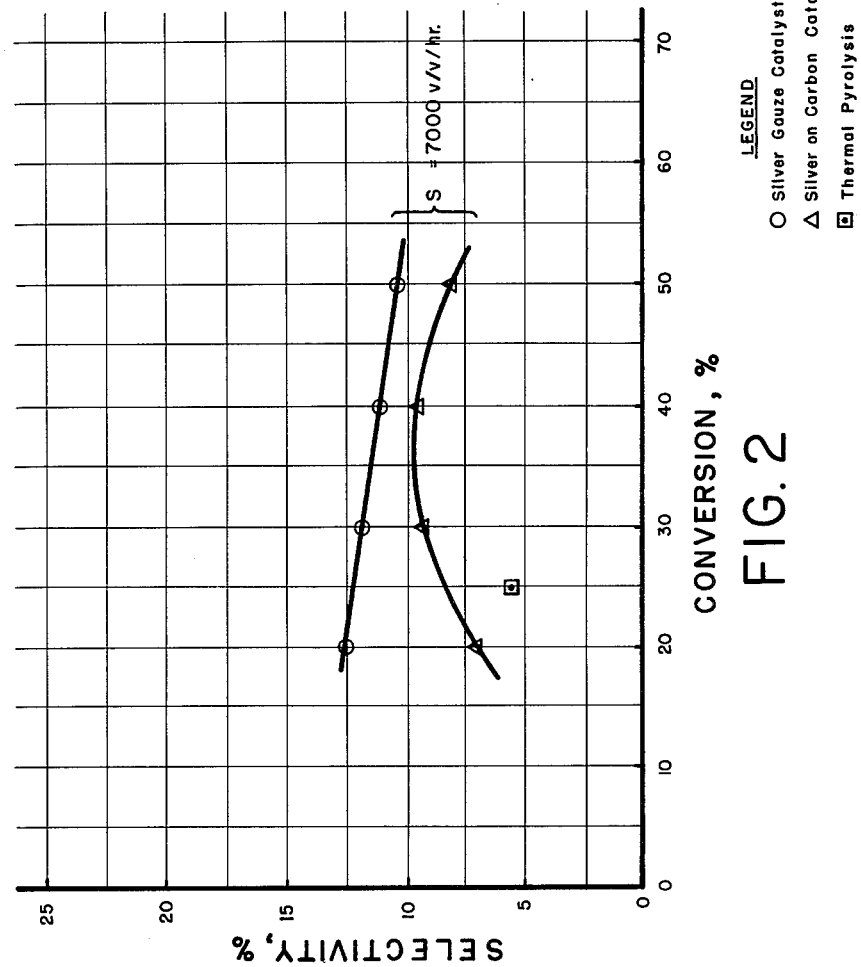

3,198,848
CATALYTIC CONVERSION OF ISOBUTYLENE AND PROPYLENE TO ALLENE AND METHYL ACETYLENE THEREOF

John Happel, Hastings on Hudson, and Charles J. Marsel, New York, N.Y., assignors to National Lead Company, New York, N.Y., a corporation of New Jersey
Filed July 6, 1961, Ser. No. 122,146
7 Claims. (Cl. 260—678)

This invention relates to an improved and novel method for the catalytic preparation of allene and methyl acetylene from isobutylene or propylene by catalytic reaction, chiefly demethanation or dehydrogenation. More specifically, it has now been found possible to convert certain aliphatic olefins such as propylene or isobutylene by catalytic reaction over specific silver-containing catalysts to a mixture of allene and methyl acetylene.

It is an object of this invention to effect the demethanation of isobutylene in high yields to useful products by controlled contacting of isobutylene with a silver-containing catalyst.

It is a further object of the invention to produce allene and methyl acetylene by an improved process by catalytic cracking of aliphatic olefins, more particularly, propylene or isobutylene.

It is another object of this invention to produce mixtures and improved yields of useful cracked products by contacting isobutylene with a silver-containing catalyst under controlled conditions of contact time, temperature, and partial pressure of cracking reactant.

Further objects of this invention will become apparent from the more detailed description thereof given below.

Numerous methods have been proposed in the past for the conversion of aliphatic hydrocarbons including olefins to methyl acetylene and allene and mixtures thereof. For example, U.S. Patent 2,763,703 describes the non-catalytic conversion of isobutylene to give the above mentioned compounds as products as well as their mixtures. In U.S. Patent 2,925,451 there is described the conversion of propylene or isobutylene by passing the selected reactant over a heated metallic filament and controlling the olefinic reactant at a very low pressure (below 100 mm. mercury). This patent disclosure teaches that the reactants, i.e. propylene and isobutylene, are interchangeable in the proposed process. It should be noted that in order to produce $C_3H_4$ hydrocarbons from these two beginning reactants, it is necessary in one case to dehydrogenate, and in the other case, to demethanate the starting olefin. Thermodynamic calculations based on these two reactions make it possible to predict that the dehydrogenation of propylene should require higher temperatures than the splitting of a methyl group from isobutylene to produce allene and methyl acetylene or mixtures thereof in both instances as the ultimate products. Experimental studies have confirmed this theory and while both propylene and isobutylene can be used as the starting materials in this improved and selective catalytic process, it has been found to be advantageous to use isobutylene as the starting material.

It has further been found that this is a surprisingly specific and selective catalytic process. A considerable number of catalysts were tested under a wide variety of operational conditions for the catalytic demethanation of isobutylene as well as for the catalytic dehydrogenation of propylene to produce $C_3H_4$ hydrocarbons. These prospective catalytic agents were tried out in the apparatus as diagrammed in FIGURE 1 and described in detail hereinbelow. They included such substances as iron oxide (butadiene producing) catalyst, activated carbon, silica-magnesia cracking catalyst, calcium carbide, chrome-alumina (dehydrogenation) catalyst, chromium promoted calcium-nickel phosphate dehydrogenation catalyst, and nickel oxide on silica catalyst. None of these materials produced detectable amounts of either allene or methyl acetylene.

However, it was found that silver, either deposited on carbon or another inert carrier or in the form of compacted silver, or silver wire gauze was highly effective in producing allene and methyl acetylene from isobutylene and propylene although isobutylene is preferred as a feed. A minimum of 0.1 wt. percent of silver is required to be present in the catalyst. Broadly to carry out the process, the equipment comprises a means for feeding the olefinic feed to the catalytic zone, means for contacting the feed at controlled rates to the catalytic zone containing the silver containing catalyst, means for controlled heating of the catalyst and preheating of the feed, means for immediate quenching of the product gases, means for condensing the product, and means for recovery of the products. Obviously, modifications of the equipment described and illustrated may be employed and will occur to those skilled in the art without departing from the scope of the invention.

Thus, to carry out the catalytic conversion, it is necessary to provide for introduction of the feed, i.e. either isobutylene or propylene and also for other gases, preferably inert gases for flushing and possibly dilution. Nitrogen is conveniently used for this purpose. Quite substantially good results can be obtained by the use of atmospheric pressures in the catalytic zone. Steam may be employed in admixture with the olefinic feed if desired. If used, the steam may be employed in admixture with the olefin feed in a concentration in the range of 2 to 15 mole percent. It is preferred but not necessary to mix the olefinic feed with any diluent used prior to the entrance of the reactant into the reaction zone. In order to control reaction conditions closely and at all times, the stream or streams of reactant and diluent are metered into the reactor by means of calibrated rotameters or by any other convenient manner. Desirably, the isobutylene or propylene feed is passed through a preheater and if necessary, a superheater in order to raise the feed to the required reactor temperature and, at the same time, to avoid excessive thermal reactions occurring before contact of the reactant with the catalyst. It is believed desirable, if not absolutely necessary, to carry out the reaction in this manner to maintain critical and essential temperature control over the reactions.

The catalytic reaction itself is carried out in a stainless steel tube providing a circular catalyst chamber about 3 to 4 times as long as its diameter, with a thermocouple running down the center. This annular space provides a space in which the catalyst is contained. Preferably, manometer taps are provided at the beginning and end of this chamber as set up in the system in order to check, from time to time, by difference, the actual pressure at which the catalytic reaction is proceeding. Thus, the actual pressure drop through the catalyst bed can be measured and also gas samples can be withdrawn at these points from time to time to determine the actual feed content to the catalyst chamber and the composition of product issuing immediately from the catalyst zone.

The hot gases leaving the catalyst bed are immediately quenched, preferably by a jet of water. This procedure results in a sharp limiting of the actual effective reaction zone to the catalyst bed, and avoids reactions and inter-conversions taking place by pyrolysis which is to be avoided. In order to achieve controlled low time of contact, also, it is necessary to cool the cracked gases very quickly to at least 500° C. after they leave the thermal catalytic zone. This shock or quick cooling of the product gases serves at least two purposes. Firstly it serves to bring the temperature of the products quickly below the pyrolytic temperature in order to keep decomposition of the products and secondary reactions to a minimum and secondly, it reduces the temperature of the methyl acetylene and the allene to lower temperatures at which polymerization reactions of these materials are minimized. A preferred method for doing this is by means of a direct water quench placed immediately after the catalytic zone, or the gases may be passed directly into a stream of spray of cold water or oil. Alternately, cool gases may be mixed with the exit gases immediately after they leave the heating zone. The substituted acetylene is separated by condensation of the steam, further compression to knock out additional water, and subsequent pressure distillation to separate the methyl acetylene and allene from other products and tars. Preferably recovered unreacted isobutylene is recycled back to the catalytic zone. It may also be desirable to pass a part of the product gases to known analytical procedures to determine the components and percentages thereof and to determine the total volume of product before the mixture is subjected to recovery and/or separation steps. For example, the product gases can be analyzed by a combination of chromatographic and chemical procedures. The following products should be determined: air, hydrogen, methane, ethane, ethylene, carbon dioxide, propane, propylene, acetylene, allene, methyl acetylene, n-butane, n-butene-1, cis-butene-2, trans-butene-2, isobutylene, isobutane, and butadiene.

The conditions which are advantageously employed are temperatures of 650 C. to 900° C. for propylene. Temperatures about 50 centigrade degrees lower are preferred for isobutylene, i.e., 600° C. to 850° C. Preferably, the gaseous reactant is passed over the catalyst at the rate of 3,000 v./v./hr. to 14,000 v./v./hr. The units of this rate measurement are volumes of gas feed/bulk volume of catalyst/hr. The pressures preferred are 50 to 500 mm. Hg. Generally, atmospheric pressure is entirely satisfactory for conducting the reaction. If desired, steam or an inert diluent can be employed to reduce the partial pressure of the hydrocarbon feed as stated above.

The silver-containing catalysts can be used in any form in which they may be available and/or desirable. For example, they may be an activated carbon or an inert carrier impregnated with silver, or they may be silver gauze. They may be contacted with the feed in any way well-known to the trade. They may be suspended or supported, or they may be used in the form of a finely-divided fluidized bed.

The following examples will serve to describe the invention in more detail. These examples are presented for the sole purpose to illustrate the invention and it is in no way intended to limit the invention thereto.

EXAMPLE 1

The operating example will be understood more completely if it is read in conjunction with the schematic diagram shown in accompanying FIGURE 1. This example will use isobutylene as the feed reactant, although it is contemplated that propylene could be employed in the same manner with different conditions being employed. Isobutylene is passed from a source such as tank 1, through valve 2, via line 3, valve 4 and metering rotameter 5 and through line 6 and inlet 13 into preheater 14. Simultaneously, nitrogen or other inert gas is passed from a source such as tank 7 through valve 9, and line 10 and valve 11 and into metering rotameter 12 and thence into line 6 to be admixed with the isobutylene prior to its introduction into preheater 14. If desired, from time to time for flushing purposes or otherwise, air may be introduced to the system via inlet and valve 8. From preheater 14 the heated mixture passes through line 15 into catalytic reactor 16. This reactor is equipped with a silver-containing catalyst bed arranged for intimate and quick contact with the feed. It also has thermocouple 20a for temperature control. Manometer taps 19a and 19b are connected with external manometers 21 for control and measurement of pressure. The reactor 16 also has temperature controller 17. After the gas feed has been subjected to the selected contact time with the catalyst, it is passed out of the reactor via line 18. It is quickly quenched with a stream of water injected via line 20 into line 18. This quench is metered from quench water reservoir 23 via lines 22 and 20 via quench water meter 21a in order to control the amount of water injected into the product stream. Air introduced by line 24 is used to apply a positive pressure over the quench liquid in reservoir 23 to force the quench into the system. Following the quenching, the cooled mixture is passed into condenser 26 via line 25. From the condenser, the condensate is collected into collector 28. The gaseous products then pass through line 29, through trap 30 to remove residual liquids, then through line 31 and through throttling valve 32 if vacuum has been employed. If not, this valve can be omitted. The gases preferably pass through line 33 through a vacuum pump (if vacuum conditions are employed) and thence, at least partially through, in series, a hydrogen analyzer, a wet test meter, and other analyzing and metering steps. Following these steps, the mixture of gases is passed to the recovery area where they are recovered and separated in any one or a combination of well-known steps. This process if operated at the optimum conditions produces yields greater than 6% when isobutylene is used with somewhat lower yields obtained from propylene.

EXAMPLE 2

Using essentially the apparatus and procedure described above, the catalyst chamber was charged with an activated carbon catalyst impregnated with silver, which was prepared by impregnating activated carbon with silver nitrate solution followed by thermal decomposition of the salt. Isobutylene was passed over this catalyst at a flow rate of 3,500 volumes of isobutylene/volume of catalyst/hr. at a temperature of 768° C. and at atmospheric pressure. On analysis, it was found that 14.0% of the isobutylene was converted and a yield of 3.9% of the isobutylene converted was found to be allene and methyl acetylene.

EXAMPLE 3

A catalyst charge was formed from 20 mesh silver gauze having wire diameters of 0.0135 inch. It was coiled into a cylinder of one inch in diameter by 3 inches long and placed inside the reactor. Thus the volume occupied by the catalyst was 45 cc. Isobutylene was passed over this catalyst at a rate of 3,500 volumes of isobutylene/bulk volume of catalyst/hr. at a temperature of 759° C. and at atmospheric pressure. A conversion of 12.0% of the isobutylene was obtained and the yield of allene plus methyl acetylene based on isobutylene converted was 1.4%. At a temperature of 866° C. and space velocity of 7,000 v./v./hr., the conversion was 65.4%, the yield 6.4% and the selectivity 9.8%.

Additional runs were made under a wide variety of conditions, employing vacuum, propylene feed and a series of different space velocities and temperatures. In general, propylene gave lower yields of methylacetylene and allene. The use of vacuum increased yields but would, of course, increase the cost of operating and processing and is to be avoided in commercial operations if possible. A typical series of runs using the silver on carbon catalyst described in Example 2 is shown in Table I below. In this series, atmospheric pressure was employed.

Table I

DEMETHANATION OF ISOBUTYLENE USING A SILVER-ON-CARBON CATALYST

| Flow Rate Space Vel., v./v./hr. | Temp., °C. | Conversion, percent | Selectivity, percent | Yield of $C_3H_4$ on charge, percent |
|---|---|---|---|---|
| 3,500 | 660 | 6.6 | 0 | 0 |
| 3,500 | 768 | 14.0 | 3.9 | 0.55 |
| 3,500 | 829 | 41.3 | 9.7 | 4.0 |
| 3,500 | 882 | 72.3 | 7.1 | 5.1 |
| 7,000 | 657 | 4.1 | 0 | 0 |
| 7,000 | 785 | 9.5 | 24.4 | 2.3 |
| 7,000 | 863 | 26.6 | 18.9 | 5.0 |
| 14,000 | 749 | 0.9 | 36.6 | 0.33 |
| 14,000 | 802 | 7.7 | 24.1 | 1.9 |

Comparable results for the catalytic demethanation using silver gauze, similar to that described in Example 3, are given in Table II below. These runs were also carried out at atmospheric pressure.

Table II

DEMETHANATION OF ISOBUTYLENE USING A METALLIC SILVER GAUZE CATALYST

| Flow Rate Space Vel., v./v./hr. | Temp., °C. | Conversion, percent | Selectivity, percent of Isobutylene converted to $C_3H_4$ | Yield, percent |
|---|---|---|---|---|
| 14,000 | 674 | 0 | 0 | 0 |
| 14,000 | 759 | 1.3 | 24.0 | 0.3 |
| 11,730 | 829 | 30.2 | 15.3 | 4.6 |
| 7,000 | 742 | 2.4 | 16.8 | 0.4 |
| 7,000 | 800 | 20.2 | 12.5 | 2.5 |
| 7,000 | 866 | 65.4 | 9.8 | 6.4 |
| 3,500 | 759 | 12.0 | 12.0 | 1.4 |
| 3,500 | 803 | 51.2 | 7.3 | 3.7 |
| 3,500 | 873 | 92.6 | 3.7 | 3.4 |
| 1,800 | 763 | 21.1 | 7.2 | 1.5 |
| 1,800 | 817 | 79.6 | 3.8 | 3.0 |
| 1,800 | 881 | 98.0 | 1.0 | 1.0 |

FIGURE 2 was plotted in order to show a comparison between the results obtained by the catalytic and pyrolytic processes. The data shown therein indicates that metallic silver produces the best selectivity to allene and methyl acetylene, and pyrolysis the lowest selectivity. Thus, at 25% conversion, the metallic silver selectivity (yield of $C_3H_4$ based on isobutylene converted) is 12%, while with silver on carbon catalyst it is 8% and with pyrolysis 5.5%.

EXAMPLE 4

In a similar manner, at a temperature of 874° C., and a space velocity of 7,000 v./v./hr., propylene passed over a silver on carbon catalyst gave a conversion of 22.8%, a yield of 1.3% and a selectivity of 5.6% at 904° C., and 3,500 v./v./hr., propylene gave a conversion of 82.5%, a yield of 1.0% and a selectivity of 1.2%.

What is claimed is:

1. An improved process for production of mixtures containing methyl acetylene and allene which comprises contacting an olefin selected from the group consisting of propylene and isobutylene and mixtures thereof with a silver catalyst at pressures of 100 mm. to atmospheric pressure, flow rates from 3,500 v./v./hr. at standard conditions (0° C., 760 mm. Hg) to 14,000 v./v./hr., and at temperatures from about 600° C. to about 900° C.

2. An improved process for production of methyl acetylene and allene which comprises contacting isobutylene with a silver catalyst at pressures of 100 mm. to atmospheric pressure, flow rates from 3,500 v./v./hr. at standard conditions (0° C., 760 mm. Hg) to 14,000 v./v./hr., and at temperatures from about 600° C. to about 850° C.

3. An improved process for production of methyl acetylene and allene which comprises contacting isobutylene with a compacted silver gauze at about atmospheric pressure, flow rates of from 3,500 v./v./hr. at standard conditions (0° C., 760 mm. Hg) to 14,000 v./v./hr., and at temperatures of about 600° C. to about 850° C.

4. An improved process for production of methyl acetylene and allene which comprises contacting isobutylene with a silver catalyst supported on an inert carrier at pressures of about atmospheric pressure, flow rates of from 3,500 v./v./hr. at standard conditions (0° C., 760 mm. Hg) to 14,000 v./v./hr., and at temperatures of about 600° C. to about 850° C.

5. An improved process for production of methyl acetylene and allene which comprises contacting propylene with a silver catalyst at pressures of 100 mm. to atmospheric pressure, flow rates from 3,500 v./v./hr. at standard conditions (0° C., 760 mm. Hg) to 14,000 v./v./hr., and at temperatures from about 600° C. to about 900° C.

6. An improved process for production of methyl acetylene and allene which comprises contacting propylene with a compacted silver gauze at about atmospheric pressure, flow rates of from 3,500 v./v./hr. at standard conditions (0° C., 760 mm. Hg) to 14,000 v./v./hr., and at temperatures from about 600° C. to about 900° C.

7. An improved process for production of methyl acetylene and allene which comprises contacting propylene with a silver catalyst supported on an inert carrier at pressures of about atmospheric pressure, flow rates of from 3,500 v./v./hr. at standard conditions (0° C., 760 mm. Hg) to 14,000 v./v./hr. and at temperatures from about 600° C. to about 900° C.

References Cited by the Examiner

UNITED STATES PATENTS

| 2,040,782 | 5/36 | Van Peski | 252—476 XR |
| 2,430,443 | 11/47 | Becker | 252—476 |
| 2,925,451 | 2/60 | Hogsed | 260—678 |

ALPHONSO D. SULLIVAN, *Primary Examiner.*

MILTON STERMAN, *Examiner.*